(12) United States Patent
Urso

(10) Patent No.: US 8,864,498 B1
(45) Date of Patent: Oct. 21, 2014

(54) APPARATUS AND METHOD FOR DRAWING AN OBJECT

(76) Inventor: Charles A. Urso, Fort Pierce, FL (US)

( * ) Notice: Subject to any disclaimer, the term of this patent is extended or adjusted under 35 U.S.C. 154(b) by 28 days.

(21) Appl. No.: 13/356,479

(22) Filed: Jan. 23, 2012

(51) Int. Cl.
*G09B 11/00* (2006.01)

(52) U.S. Cl.
USPC .............................................................. 434/91

(58) Field of Classification Search
USPC ................ 434/81, 84, 85, 88, 89, 90, 91, 92; 33/1 K, 276, 277
See application file for complete search history.

(56) References Cited

U.S. PATENT DOCUMENTS

| | | | | | |
|---|---|---|---|---|---|
| 254,178 | A | * | 2/1882 | Perk Van Lith | 33/277 |
| 1,771,903 | A | * | 7/1930 | Soth | 33/277 |
| 1,821,252 | A | * | 9/1931 | Woods | 33/277 |
| 2,263,101 | A | * | 11/1941 | Perry | 33/277 |
| 2,401,105 | A | * | 5/1946 | Richards | 434/90 |
| 2,410,447 | A | * | 11/1946 | Juran | 434/91 |
| 2,418,286 | A | * | 4/1947 | Austin | 434/85 |
| 2,796,666 | A | * | 6/1957 | Liebowitz | 33/262 |
| 3,086,296 | A | * | 4/1963 | Bergstrom | 434/90 |
| 3,096,587 | A | * | 7/1963 | Kenney | 33/277 |
| 3,660,903 | A | * | 5/1972 | Caperton, Jr. | 33/276 |
| 3,678,589 | A | * | 7/1972 | Baier | 33/277 |
| 3,844,049 | A | * | 10/1974 | Suvada | 33/262 |
| 4,008,528 | A | * | 2/1977 | Caulfield | 434/91 |
| 4,379,364 | A | * | 4/1983 | Fish | 33/277 |
| 4,439,159 | A | * | 3/1984 | Hunter | 434/85 |
| 5,100,325 | A | * | 3/1992 | Cutler | 434/91 |
| 5,580,250 | A | * | 12/1996 | McKewen | 434/91 |
| 7,401,410 | B1 | * | 7/2008 | Jewell | 33/1 K |
| 7,481,654 | B1 | * | 1/2009 | Mateo | 434/91 |
| 7,513,773 | B1 | * | 4/2009 | Oakes et al. | 434/91 |
| 7,926,188 | B2 | * | 4/2011 | Thorkelson | 33/1 K |

* cited by examiner

*Primary Examiner* — Kurt Fernstrom
(74) *Attorney, Agent, or Firm* — Ronald V. Davidge

(57) ABSTRACT

A device for aiding a user in drawing an image of an object includes a clear plate and a frame fitting over the shoulders of the user and holding the plate at a location where the object can be drawn on a clear drawing medium attached to the plate while it is viewed through the clear plate and through the clear drawing medium.

18 Claims, 6 Drawing Sheets

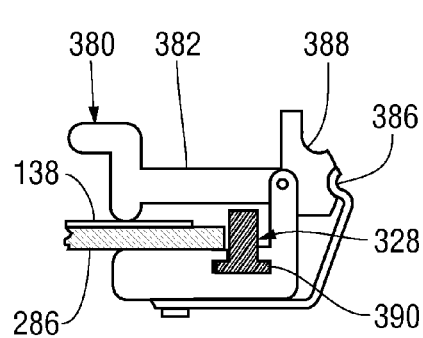
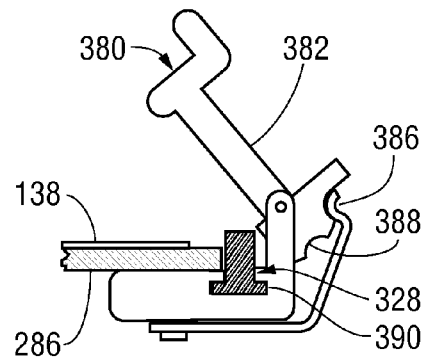
FIG. 17
FIG. 18
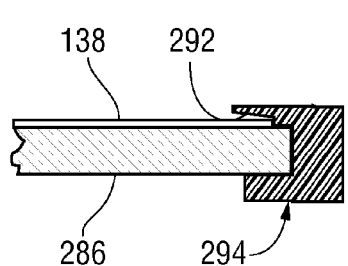
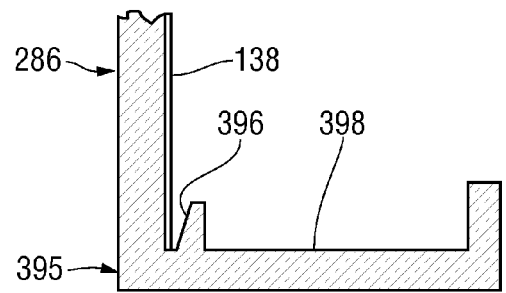
FIG. 19
FIG. 20

APPARATUS AND METHOD FOR DRAWING AN OBJECT

RELATED APPLICATIONS

Not Applicable.

FEDERALLY SPONSORED REASEARCH OR DEVELOPMENT

Not Applicable.

FEDERALLY SPONSORED RESEARCH OR DEVELOPMENT

Not Applicable.

BACKGROUND OF THE INVENTION

1. Field of the Invention

This invention relates to an apparatus and method used in drawing an image of an object.

2. Summary of the Background Information

It is known in the field of commercial art that a commercial artist can trace a real image that is projected through a lens and focused on an art board. For example, such a tracing process can be used in the production of art work from projected microfilm images and in the production of billboards and other large signs from relatively small drawings.

The patent literature additionally describes examples of an apparatus for tracing a virtual image appearing to be formed on an art board, with the artist viewing the art board as light transmitted through a transparent plate held at an oblique angle, while simultaneously viewing the image to be traced off as reflected off a surface of the transparent plate. For example, the artist may view a virtual image of an illuminated object held above the transparent plate, to be reflected off the surface of the transparent plate, while simultaneously viewing the art board through the transparent plate, and while tracing the image onto the art board with his hand moving within the space between the transparent plate and the art board. Alternately, a draftsman may trace a pattern, such as lettering printed on a card, with the card and the transparent plate being held in a V-shaped relationship above the art board

SUMMARY OF THE INVENTION

According to a first aspect of the invention, an apparatus including a clear plate and a frame is provided to facilitate the drawing of an image of an object by a user. The frame holds the clear plate in a position, relative to the user, suitable for viewing the object through the clear plate and for drawing elements of the object at locations where the elements appear to the user viewing the object with one eye on a clear drawing medium attached to the clear plate. The object itself, not a reflection or projected image of the object is viewed through the clear plate.

The frame includes a first portion configured to fit over shoulders of the user facing in a first direction and a second portion extending in the first direction to hold the clear plate in a location suitable for the user with the first portion fitting over his shoulders to view the object through the clear plate and to draw on a clear drawing medium held on a front surface of the clear plate. The second portion extends under a space adjacent the front surface of the clear plate. For example, the first portion of the frame includes a contact surface facing opposite the first direction to be held against the user facing in the first direction with the first portion fitting over his shoulders, with the front surface of the clear plate being held in a location spaced in the first direction from the contact surface within a range of 15 centimeters to 45 centimeters. This spacing distance may be adjustable. Preferably, the first portion of the frame includes at least one frame surface configured to rest atop the shoulders of the user as the user faces in the first direction, while the second portion of the frame is configured to hold a lower edge of the clear plate spaced away from the at least one frame surface and in alignment in a direction perpendicular to the first direction with the at least one frame surface.

The apparatus may additionally include at least one clamping device configured to removably hold an edge of the clear drawing medium against the clear plate, or at least one slot extending adjacent an edge of the front surface of the clear plate to hold an edge of the clear drawing medium. For example, the clamping device may include a pair of jaws disposed at opposite sides of the clear plate, a spring holding the jaws against a clear drawing medium placed on the front surface of the clear plate, and a pair of handles moving the jaws apart as the handles are squeezed together. Alternately, the clamping device may include a clamping member and a spring holding the clamping member in a closed position, against the clear drawing member placed on the front surface of the clear plate, and in an open position, away from the clear drawing member placed on the front surface of the clear plate. Alternately, the clamping device may include a clamping block mounted to slide along an edge of the clear plate and a flexible member held against the clear4 drawing member placed on the front surface of the clear plate.

In a second embodiment of the invention, the frame includes a left frame member, a right frame member, and a transverse support member, with a left end of the clear plate and a left end of the transverse support member being pivotally attached to the left frame member, while the right end of the clear plate and a right end of the transverse support member are pivotally attached to the right frame member. The apparatus is movable between a folded configuration, in which the left and right frame members, the clear plate, and the transverse support member each extend in the first direction, and an open configuration, in which the left and right frame members each extend in the first direction, while the clear plate and the transverse support member each extend in a direction perpendicular to the first direction. The apparatus preferably additionally includes at least one clamping member mounted to slide along one of the left and right frame members between a position holding the clear plate to extend in the direction perpendicular to the first direction, and a position releasing the clear plate to pivot as the apparatus is moved between the open and closed positions.

In a third embodiment of the invention, the frame includes a left frame member, a right frame member, a pair of upward-extending support members, between which the clear plate is fastened, a pair of downward-extending support members, and a transverse support member, which is fastened between the pair of downward-extending support members. These elements are fastened to one another using outward-extending pluralities of pins engaging pluralities of holes, with additional holes being provided to allow adjustment of the locations of various elements.

According to a second aspect of the invention, a method for drawing an image of an object by a user is provided. The method includes: attaching a clear drawing medium to a front surface of a clear plate held within a drawing frame; placing the drawing frame over the shoulders of the user; aligning the user and the drawing frame so that the user views the object through the clear plate; and drawing the image of the object on the clear drawing medium while viewing the object with one eye. As this method is performed, the user contacts the clear drawing medium with the drawing instrument at points where he sees elements of the object, with light from each element of the object traveling in an essentially straight line through the clear plate and the clear drawing medium into the one eye that is being used. For example, the edges of the object may be traced to quickly form an outline in the drawing, with the balance and perspective of the drawing being determined automatically from the placement of the object, and with no power other than ambient light being needed to make the object visible.

These steps may be preceded by moving the drawing frame from a closed condition, in which the clear plate, left and right frame members, and a transverse support plate all forming the drawing frame, each extend in a common direction, and an open condition, in which the clear plate and the transverse support plate extend perpendicular to the common direction, between the left and right frame members.

BRIEF DESCRIPTION OF THE DRAWINGS

Various aspects of the invention will be made apparent by reading the following specification in conjunction with the accompanying figures, in which:

FIG. 17 is a plan view showing a third clamp in a closed position, holding a drawing medium on a clear plate within the drawing frame of FIG. 11;

FIG. 18 is a plan view showing the clamp of FIG. 17 in an open position, releasing a drawing medium on the clear plate within the drawing frame of FIG. 11;

FIG. 19 is a cross-sectional elevation of a frame member providing a slot for holding a drawing medium on the clear plate within the drawing frame of FIG. 11; and FIG. 20 is a fragmentary cross-sectional elevation of an optional extended clear plate providing a slot for holding a drawing medium on the clear plate within the drawing frame of FIG. 11.

DETAILED DESCRIPTION OF THE INVENTION

Figure 1:
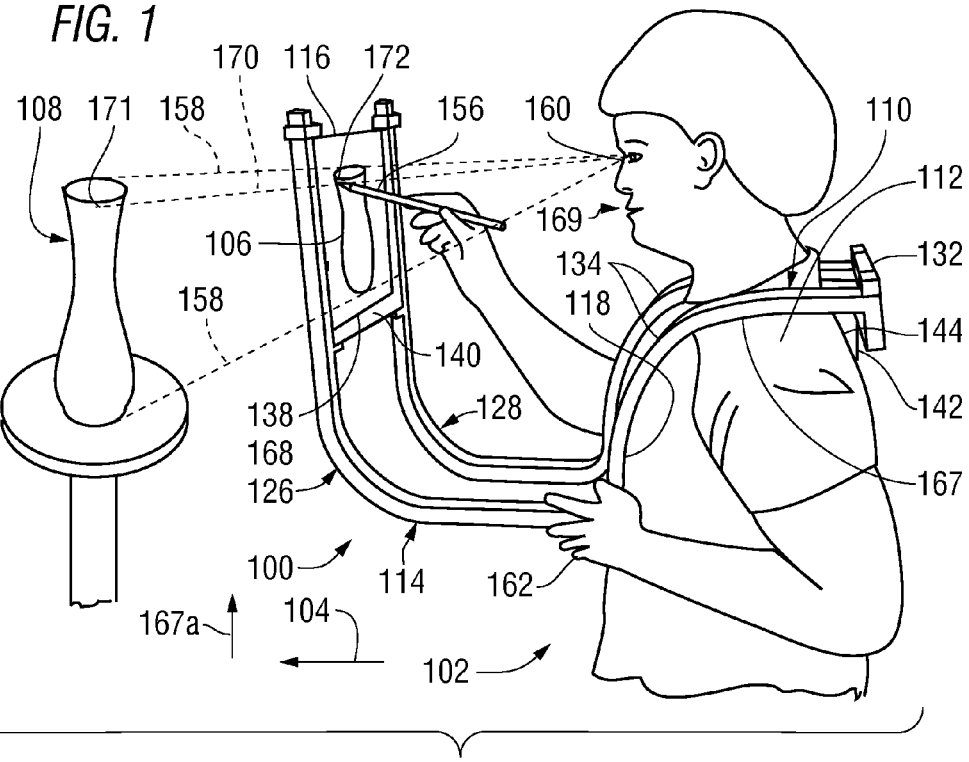
FIG. 1 is a perspective view of a drawing frame built in accordance with a first embodiment of the invention used according to a method of the invention to trace an object.

FIG. 1 is perspective view of a drawing frame 100, built in accordance with a first embodiment of the present invention, shown as being used by a user 102, facing in a first direction, indicated by arrow 104 to facilitate drawing an image 106 of an object 108. The drawing frame 100 includes a first portion 110, resting on the shoulders 112 of the user 102, and a second portion 114, extending from the first portion 110 in the first direction of arrow 104 to hold a clear plate 116 at a distance, in the first direction of arrow 104 from a surface 118 of the first portion 110, that is suitable for viewing the object 108 and for drawing the image 106. For example, this distance is within a range of 15-45 centimeters. Various elements of the drawing frame 100 are preferably composed of a plastic resin, and may instead be composed of other materials, including metals and wood. The clear plate 116 is preferably composed of a transparent plastic resin, and may alternatively be composed of glass.

The drawing frame 100 is further illustrated as including a left frame member 126, a right frame member 128, a clear plate 116 and a support plate 132. Both the clear plate 116 and a transverse support plate 132 extend between the left frame member 126 and the right frame member 128. The drawing frame 100 is used as shown in FIG. 1, with curved portions 134 of the left frame member 126 and the right frame member 128 resting over the shoulders 112 of the user 102. A clear drawing medium 138 is attached to a front surface 140 of the clear plate 116. In the example of FIG. 1, the transverse support plate 132 includes flexible portions 142 which rests upon the back 144 of the user 102, providing an accommodation for users of different sizes.

The clear drawing medium 138 is, for example, a clear acetate sheet attached to the clear plate 116 by clips, adhesive tape, and/or elastomeric structures, such as rubber bands. Alternately or additionally, the clear plate 116 may be composed of a material providing triboelectric charging relative to the material of the clear drawing medium 138, so that the clear drawing medium 138 is held on the clear plate 116 by electrostatic forces. The user 102 views the object 108 to be drawn through the clear drawing medium 138 and through the clear plate 116 while drawing the image 106 of the object 108 on the clear drawing medium 138 using a drawing instrument 156. The drawing instrument 156 may be any instrument capable of marking on the clear drawing medium 138, such as a pen, a felt marker, or a crayon. The ink supplied by the drawing instrument 156 may be permanent or washable, depending on the conditions in which the drawing frame 100 is used, and due to the intended subsequent use of the finished drawing.

The size of the image 106 is reduced from the size of the object 108 as shown by dashed lines 158, allowing the drawing frame 100 to be used to draw relatively small objects, such as the object 128 as shown, in close proximity to the clear plate 116, and additionally to draw large objects, such as trees and mountains, at greater distances. For a wide range of objects, the user 102 can easily change the size of the image 106 that will be drawn by moving toward or away from the object 108 while holding the drawing frame 100 as shown in the drawing. The perspective of the image 106 and the portion of the object 108 which will be drawn may also be changed by moving so that the geometrical relationship between the clear plate 116 and the object 108 is varied.

Preferably, the process of drawing the image 106 is begun by drawing a number of segments of the image 106 with one eye closed, as a steady geometric relationship is maintained between the open eye 160 of the user 102, the clear plate 116, and the object 108. As the phrase is used herein, "viewing the object with one eye" implies that the other eye is closed or blocked with a patch, that the user only has vision in one eye, or that, for neurological or physiological reasons, one eye of the user is so dominant over the other that the image from the other eye is not seen with both eyes open. The drawing frame 116 is built to facilitate maintaining such a relationship, with the curved portions 134 of the left frame member 126 and the right frame member 128 resting on the shoulders 112 of the user 102 and with the support plate 132 resting on the back 144 of the user 102. The user may further stabilize the drawing frame 100 with one hand 162. The left and right frame members 126, 128 are particularly configured to provide a space 164 in which the user 102 can easily move his arms 166 while drawing the image 106.

Preferably, the drawing frame 100 is configured so that, when it placed on the shoulders 112 of the user 102, as shown in FIG. 1, frame surfaces 167 of the frame members 126, 128 are aligned in a direction, indicated by arrow 167a, perpendicular to the first direction 104 with a lower edge 168 of the clear plate 116, so that the clear plate 116 is held in front of the face 169 of the user 102.

The method of this invention works as the user 102 views the object 108 through the clear plate clear 116 and through the clear drawing medium 138 with the single eye 160 along a straight line 170, with an exemplary element 171 of the object 108 appearing at a location 172 on the clear drawing medium 138, where corresponding markings are made with the drawing tool 156. The other eye (not shown) is closed or covered with a patch because a straight line (not shown) from the other eye to the element 171 of the object 108 crosses the clear drawing medium 138 at a different point, spaced away from the location 172. If the object 108 is viewed with both eyes for a period of time, most people will see the location of the element 171 on the drawing medium 138 as shifting between two separate locations.

Figure 2:
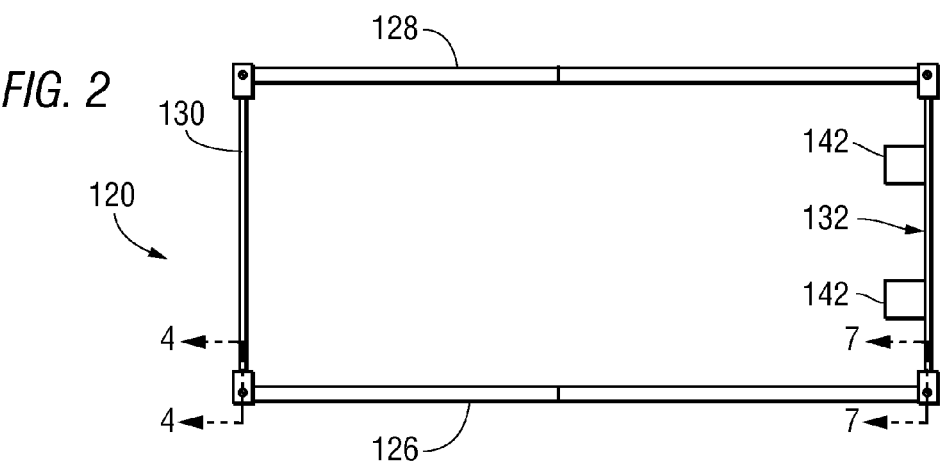
FIG. 2 is a plan view of a second embodiment of the drawing frame of FIG. 1, shown in an open configuration.
Figure 3:
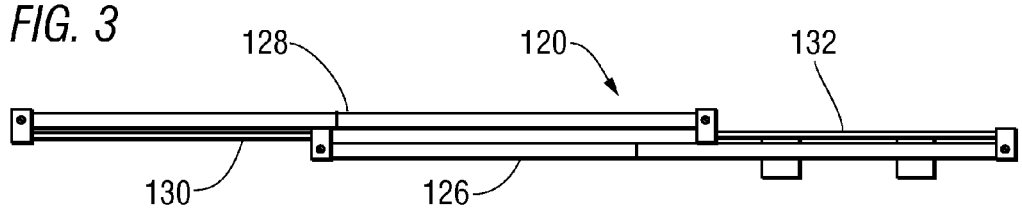
FIG. 3 is a plan view of the drawing frame of FIG. 2, shown in a folded configuration.

In accordance with a second embodiment of the invention, a drawing frame 120 is configured to be folded from an open configuration, in which the drawing frame 120 can be used as described above in reference to FIG. 1, and a folded condition, in which the drawing frame 120 can be easily distributed, transported, and stored. FIG. 2 is a plan view of the drawing frame 120 in the open configuration, while FIG. 3 is a plan view of the drawing frame 120 in the closed condition. To provide for this change in configurations, a clear plate 130 and the transverse support plate 132 are each pivotally attached on the left frame member 126 and the right frame member 128. In FIGS. 2 and 3, elements similar to those of FIG. 1 are accorded like reference numbers.

Figure 4:
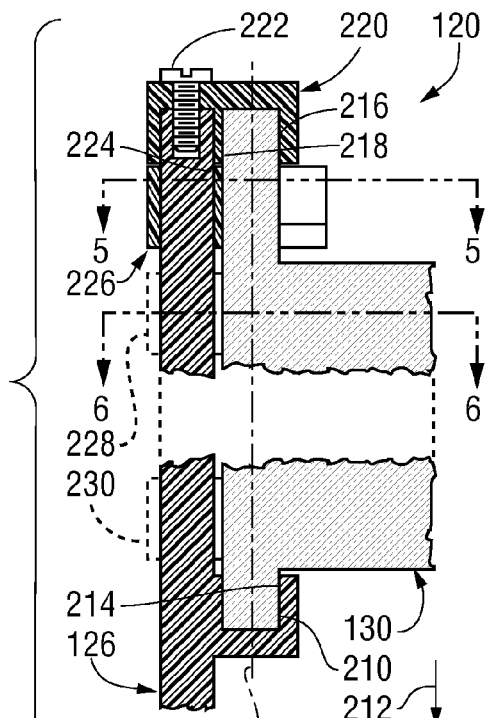
FIG. 4 is a fragmentary cross-sectional front elevation of the drawing frame of FIG. 2, taken as indicated by section lines 4-4 therein.

FIG. 4 is a first fragmentary cross-sectional front elevation of the drawing frame 120, taken as indicated by section lines 4-4 in FIG. 2 to show the pivotal attachment of the clear plate 130 to the left frame member 126. The clear plate 130 includes, at each end, a cylindrical pin 210, extending downward, in the direction of arrow 212, pivoting within a lower pivot hole 214 in the left frame member 126, and a cylindrical pin 216, extending upward, opposite the direction of arrow 212, pivoting within an upper pivot hole 218 in a mounting block 220, which is attached to the left frame member by a screw 222. The mounting block 220 additionally includes a square hole 224, preventing rotation of the mounting block 220 during attachment with the screw 222. A clamping block 226 slides along the left frame member 126 between a released position, in which it is shown in FIG. 4, and a clamping position, indicated for example by dashed lines 228, 230.

Figure 5:
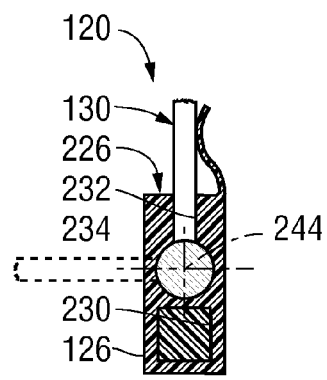
FIG. 5 is a fragmentary cross-sectional plan view of the drawing frame of FIG. 2, taken as indicated by section lines 5-5 in FIG. 2.

FIG. 5 is a first fragmentary cross-sectional plan view of the drawing frame 120, taken as indicated by section lines 5-5 in FIG. 4 and showing the clamping block 226 in the released position. The clamping block 226 includes a square hole 230 and a keyhole-shaped aperture 232, allowing the clamping block 226 to be slid upward and downward by the user 102, along both the left frame member 126 and the cylindrical pin 218, and additionally allowing the clear plate 130 to be pivoted between the position in which it is shown, within the opened configuration of FIG. 2, and the position indicated by a dashed line 234, within the folded configuration of FIG. 3.

Figure 6:
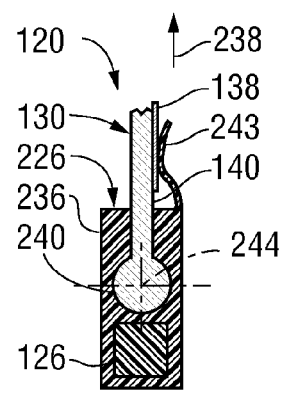
FIG. 6 is a fragmentary cross-sectional plan view of the drawing frame of FIG. 2, taken as indicated by section lines 6-6 in FIG. 2.

FIG. 6 is a second fragmentary cross-sectional plan view of the drawing frame 120, taken as indicated by section lines 6-6 in FIG. 4 and showing the clamping block 226 in the clamping position indicated by dashed lines 228. With the clamping block 226 in this position, the pivoting movement of the clear plate 130 from the position in which it is shown is prevented by tabs 236, extending inward, in the direction of arrow 238, along each side of the keyhole-shaped aperture 232. The clamping block 226 can still move upward and downward, moving along the left frame member 126 and along a rounded end portion 240 of the clear plate 130. Preferably, the clamping block 226 additionally includes a flexible tab 243, which is held against the clear drawing medium 138 with the clamping block 226 in an engaged position, helping to hold the clear drawing medium 138 in place. The clamping block 226 can be moved upward and downward to various locations along the rounded portion 240 of the clear plate 130, allowing variations in the placement of the clear drawing medium 138. Thus, the clear plate 130 pivots on the front frame member 126 about a pivot axis 244 on the left frame member 126, with the pivot axis 244 being established by coaxial holes 216, 224, in which coaxial pins 210, 218 are pivotally mounted.

Figure 7:
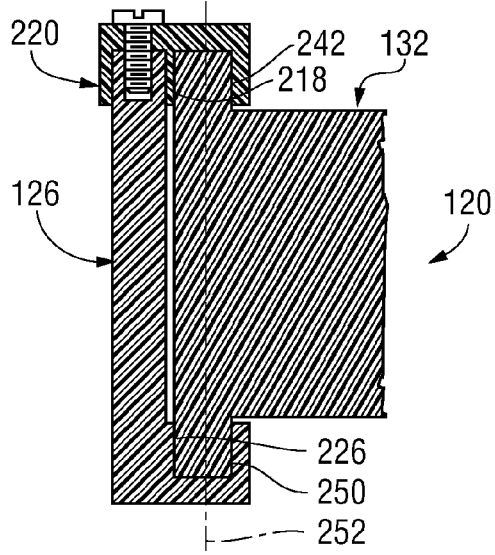
FIG. 7 is a fragmentary cross-sectional front elevation of the drawing frame of FIG. 2, taken as indicated by section lines 7-7 therein.

FIG. 7 is a second fragmentary cross-sectional elevation of the drawing frame 120, taken as indicated by section lines 7-7 in FIG. 2 to show the pivotal attachment of the transverse support plate 132 to the front frame member 126. The configuration for this attachment is similar to the configuration described above in reference to FIG. 4, with another mounting block 220 being pivotally engaging a cylindrical pin 242 extending upward as a part of the transverse support plate 132, while a hole 246 within the front frame member 126 pivotally engages a cylindrical pin 250 extending downward as a part of the transverse support plate 132. Thus, the transverse support plate 132 pivots on the left frame member 126 about a pivot axis 252, with the pivot axis 252 being established by coaxial holes 216, 246, in which coaxial pins 242, 250 are pivotally mounted.

Figure 8:
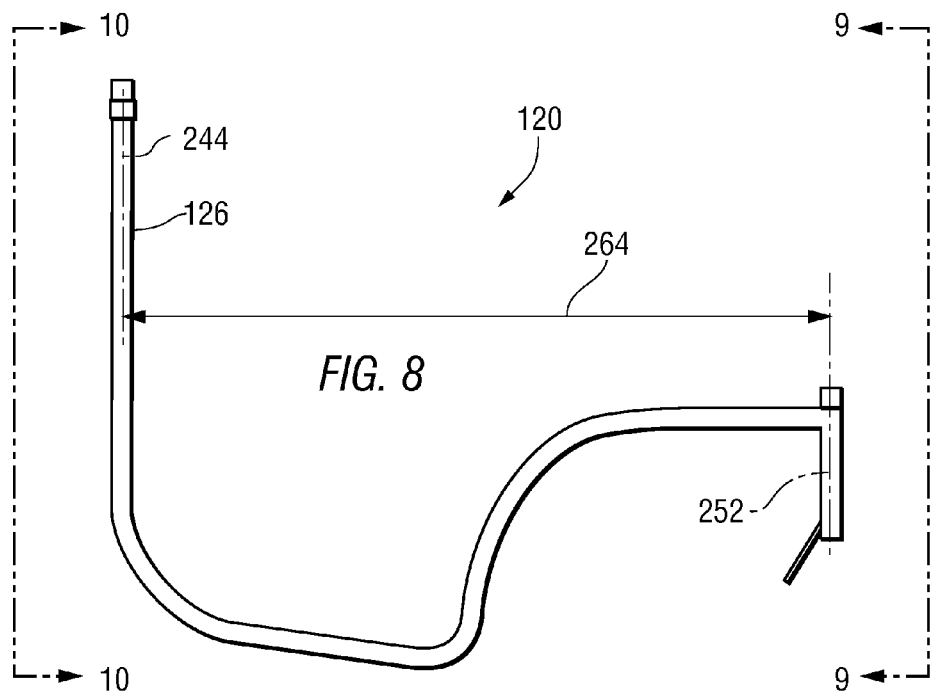
FIG. 8 is a left elevation of the drawing frame of FIG. 2
Figure 9:
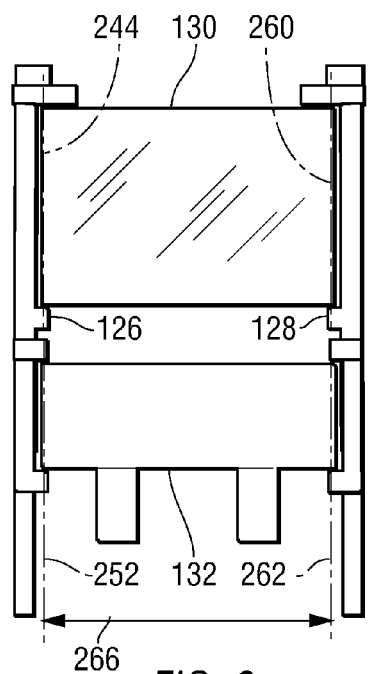
FIG. 9 is a front elevation of the drawing frame of FIG. 2, taken as indicated by section lines 9-9 in FIG. 8.
Figure 10:
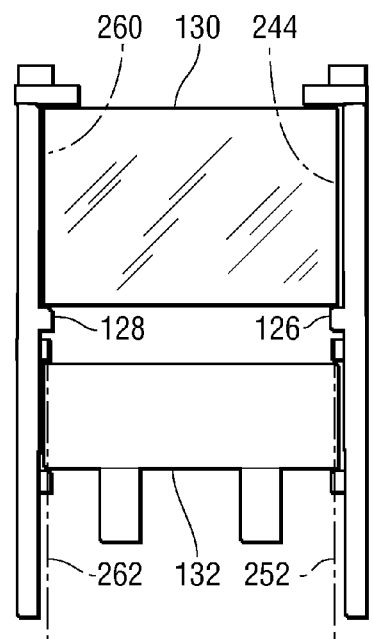
FIG. 10 is a rear elevation of the drawing frame of FIG. 2, taken as indicated by section lines 10-10 in FIG. 8.

The geometric relationships required for folding the drawing frame 120 are further shown within FIGS. 8-10, in which FIG. 8 is a left elevation of the drawing frame 120, while FIG. 9 is a front view thereof, taken as indicated by section lines 9-9 in FIG. 8, and FIG. 10 is a rear view thereof taken as indicated by section lines 10-10 in FIG. 8. The pivot axes 244 and 253, disposed along the left frame member 126 as described above in reference to FIGS. 4-7, are parallel to one another. The clear plate 130 and the transverse support plate 132 are additionally pivotally mounted to the right frame member 128 in a manner similar to that described above, with pivot axes 260 and 252 also being parallel to one another and to pivot axes 244 and 254. The pivot axes 260 and 262, disposed along the right frame member 128, are separated from one another by a distance 264 equal to that separating the pivot axes 244 and 252, disposed along the left frame member 126. The pivot axes 244 and 260 of the clear plate 130 are separated from one another by a distance 266 separating the pivot axes 252 and 262 of the transverse support plate 132.

Figure 11:
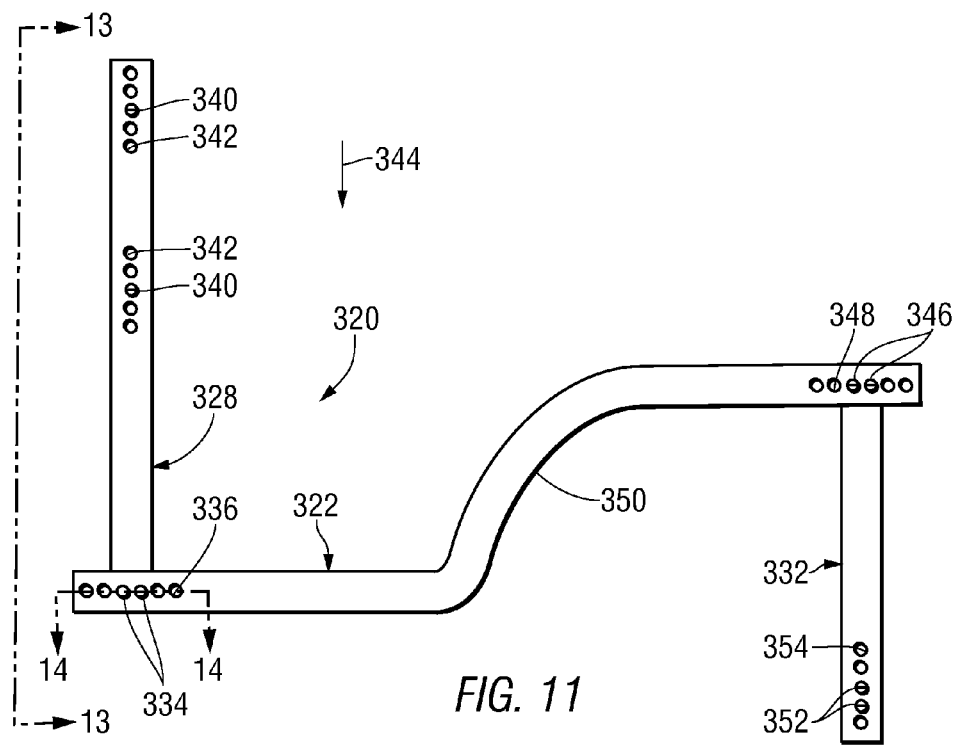
FIG. 11 is a left elevation of a third embodiment of a drawing frame configured for use as shown in FIG. 1.
Figure 12:
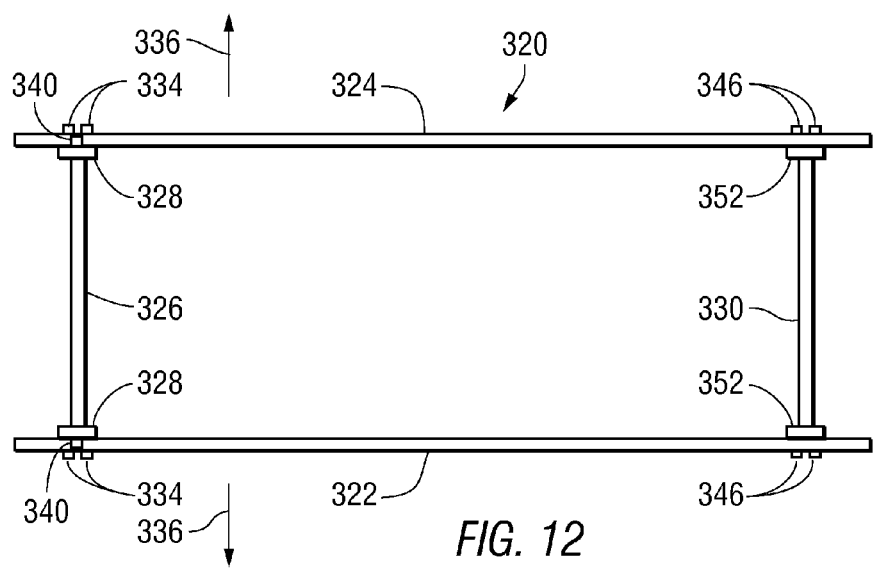
FIG. 12 is a plan view of the drawing frame of FIG. 11.
Figure 13:
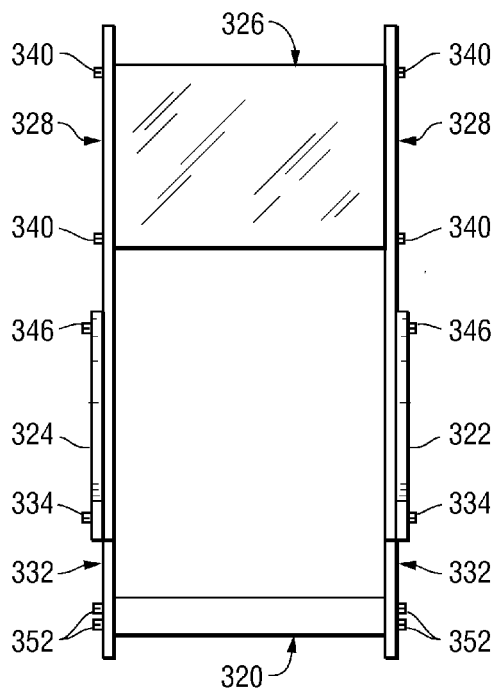
FIG. 13 is a rear elevation of the drawing frame of FIG. 11, taken as indicated by section lines 13-13 therein.

In accordance with a third embodiment of the invention, a drawing frame 320, which is used in the manner described above to facilitate drawing an image detachably connected to a number of transverse elements, with the detachable connections allowing the drawing frame 320 to be stored in a narrow area and to be easily assembled for its intended use. Preferably, the detachable connections can be assembled in a number of ways, providing geometrical variations allowing for differences among various users and differences in drawing conditions. Various aspects of the drawing frame 320 will now be discussed, with reference being made to FIGS. 11-13. FIG. 11 is a left elevation of the drawing frame 320, while FIG. 12 is a plan view thereof, and while FIG. 13 is a rear view thereof, taken as shown by section lines 13-13 in FIG. 11. The drawing frame 320 includes a left frame member 322, a right frame member 324, a clear plate 326 extending between upward-extending support members 328, and a transverse support member 330 extending between downward-extending support members 332.

The image to be drawn can be modified by adjusting the position of the clear plate 326 relative to the left and right frame members 322, 324. Each of the upward-extending support members 328 includes a pair of attachment pins 334 extending outward, in the direction of arrows 336 at each side of the drawing frame 320, engaging a pair of attachment holes 336 in an adjacent frame member 322, 324. Moving the attachment pins 334 from one pair of holes 336 to another within each of the frame members 322, 324 varies the distance between a front surface 338 of the clear plate 326 and the eye of the user, with the user holding the drawing frame 320 on his/her shoulders, as discussed above in reference to FIG. 1, so that the size of the image being drawn is changed. Such variation can also be used to accommodate variations in the size of the user, particularly regarding the length of his/her arms. The clear plate 326 is attached to each of the upward-extending support members 328 by a pair of attachment pins 340, extending outward, in the direction of arrow 336, from the clear plate 326, engaging a pair of attachment holes 342. Moving the attachment pins 340 from one pair of attachment holes 342 to another moves the clear plate 326 upward, in the direction of arrow 344, or downward, opposite this direction, varying the perspective of the image being drawn and/or varying the portion of an extended image that will be drawn.

Variation of the position of the transverse support member 330 relative to the left and right frame members 322, 324 is used to compensate for changes in the size of the user. For example, each of the downward-extending frame members 332 holding the transverse support member 330 includes a pair of attachment pins 346 extending outward, engaging a pair of attachment holes 348 within an adjacent frame member 322, 324. Moving the attachment pins 346 from one pair of holes 348 to another within each of the frame members 322, 324 varies the distance between the transverse support member 330 and the curved portion 350 of the frame members 322, 324, providing an adjustment that can be used to accommodate users of different sizes. The transverse support member 330 is attached to each of the downward-extending support members 332 by a pair of attachment pins 352, extending outward from the transverse support structure 330, engaging a pair of attachment holes 354 Moving the attachment pins 352 from one pair of attachment holes 354 to another moves the transverse support member 330 upward or downward, providing an adjustment that may be used to make the drawing frame 320 fit more comfortably over the shoulders of the user.

Figure 14:
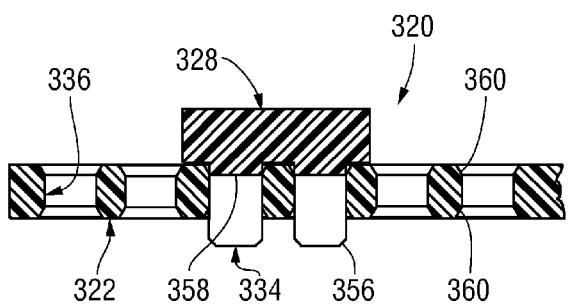
FIG. 14 is a fragmentary cross-sectional plan view of the drawing frame of FIG. 11; taken as indicated by section lines 14-14 therein.

FIG. 14 is a fragmentary cross-sectional plan view of the drawing frame 320, taken as indicated by section lines 14-14 in FIG. 11 to show the pins 344 engaging a pair of the holes 336 to attach one of the upward-extending support members 328 to the left frame member 322. Preferably, the pins 334 include beveled ends 356 to simplify their alignment with the holes 336 and slots 358 to provide resilience allowing the pins 334 to be held in place within the holes 336. Preferably, the holes 336 include beveled edges 360 on each side, further simplifying the alignment of the pins 334 therewith and providing for the use of identical parts for the left and right frame members 322, 324. Preferably, all the pins and holes described above in reference to FIGS. 11-13 are formed as described in reference to FIG. 14.

Preferably, the drawing frame 120 and the drawing frame 220 each include a means to removably attach the clear drawing medium 138 (shown in FIG. 1). For example, the clear drawing medium 138 may be attached by adhesive surfaces covering a portion of the clear plate 130, 326 or a portion of the drawing medium 138, or by pieces of adhesive tape. Alternately, the clear drawing medium 138 may be removably attached to the clear plate 130, 326 by electrostatic forces generated, for example, by a triboelectric difference between the materials of the clear drawing medium 138 and the clear plate 130, 326. In addition or alternatively, one or more mechanical clamping devices may be provided for the removable attachment of the clear drawing medium 138. Examples of such mechanical clamping devices are found in the flexible tabs 247 described above in reference to FIG. 6. Other examples of such mechanical clamping devices will now be described in reference to FIGS. 15-18.

Figure 15:
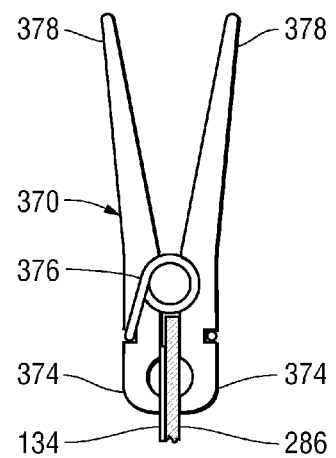
FIG. 15 is an elevation showing a first clamp holding a drawing medium on a clear plate within the drawing frame of FIG. 11.
Figure 16:
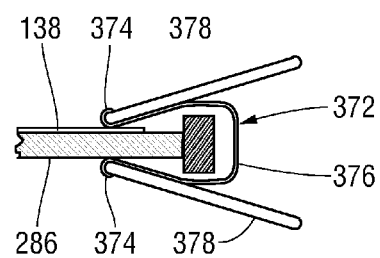
FIG. 16 is a plan view showing a second clamp holding a drawing medium on a clear plate within the drawing frame of FIG. 11.

For example, conventional devices or modified versions thereof, such as a clothes-pin device 370, shown in FIG. 15, or a binder clip 372, shown in FIG. 16, may be provided to removably attach the drawing medium 138 to the clear plate 286. Each of these devices 370, 372 includes clamping jaws 374, a spring 376 holding the jaws 374 together, and handles 378 that are squeezed together to separate the clamping jaws 374. Alternately, a clamping device 380 movable between a closed position, as shown in FIG. 17, holding the clear drawing medium in place, and an open position, as shown in FIG. 18, allowing the clear drawing medium 138 to be removed and replaced, may be provided. A clamping member 382 is pivoted at a pin 384 to move between the closed and open positions, being held in either position by a spring 386 within a detent groove 388. Alternately, the detent grooves 388 may be replaced with an eccentric surface arranged so that the energy stored in the spring 386 is maximized at a point midway between the closed position of FIG. 17 and the open position of FIG. 18. The clamping device 380 may be mounted on a track 390 to slide along an adjacent frame member, such as an upward-extending support member 328.

At least one edge of the clear drawing medium 138 may be held in place within a groove 392 extending along a frame member 394 adjacent to the clear plate 286, as shown in FIG. 13. As shown in FIG. 20, a lower portion 395 of the clear plate 286 may be extended to provide a groove 396 for holding the lower edge of the clear drawing medium 138, and, optionally, for provide a tray 398 for holding pens, crayons, a ruler, etc.

It is understood that, while various devices and modifications have been described as applied to the drawing frame built in accordance with the one of the embodiments of the invention, this description has been by way of example, since such devices and modifications could readily be applied to the drawing frame built in accordance with the other embodiment of the invention. It is further understood, that, while various parts and features have been described with some degree of particularity, such descriptions have been given only by way of example, and that many variations are possible within the spirit and scope of the inventions, which is understood to be limited only by the appended claims.

What is claimed is:

1. An apparatus for facilitating drawing an image of an object by a user, wherein the apparatus comprises:
   a clear plate; and
   a frame holding the clear plate in a position, relative to a user, suitable for viewing the object through the clear plate and for drawing elements of the object at locations where the elements appear to the user viewing the object through one eye on a clear drawing medium attached to the clear plate, wherein the frame comprises a first portion, configured to fit over shoulders of the user as the user faces in a first direction, and a second portion extending in the first direction to hold the clear plate at the position, relative to the user, wherein the front surface of the clear plate faces opposite the first direction, and wherein the second portion extends under a space adjacent the font surface of the clear plate allowing the hands of user to placed adjacent the first surface of the clear plate.

2. The apparatus of claim 1, wherein
   the first portion of the frame includes a contact surface facing opposite the first direction to be held against the user facing in the first direction with the first portion fitting over his shoulders, and
   the front surface of the clear plate is held in a location spaced in the first direction from the contact surface within a range of 15 centimeters to 45 centimeters.

3. The apparatus of claim 1, wherein a distance between the contact surface and the front surface of the clear plate is adjustable.

4. The apparatus of claim 1, additionally comprising at least one clamping device configured to removably hold an edge of the clear drawing medium against the clear plate.

5. The apparatus of claim 4, wherein the clamping device includes:
   a pair of jaws disposed at opposite sides of the clear plate;
   a spring holding the jaws against the clear plate and against the clear drawing medium placed on the front surface of the clear plate; and
   a pair of handles moving the jaws apart as the handles are squeezed together.

6. The apparatus of claim 4, wherein the clamping device includes:
   a clamping member; and
   a spring holding the clamping member in a closed position, against the clear drawing member placed on the front surface of the clear plate, and in an open position, away from the clear drawing member placed on the front surface of the clear plate.

7. The apparatus of claim 4, wherein the clamping device includes:
   a clamping block mounted to slide along an edge of the clear plate, and
   a flexible member held against the clear drawing member placed on the front surface of the clear plate.

8. The apparatus of claim 1, additionally comprising at least one slot extending adjacent an edge of the front surface of the clear plate to hold an edge of the clear drawing medium.

9. The apparatus of claim 1, wherein the frame comprises a left frame member, a right frame member and a transverse support member configured to extend adjacent a back of the user facing in the first direction with the first portion fitting over his shoulders.

10. The apparatus of claim 9, wherein the transverse support member is attached to the left and right frame members in a manner allowing adjustment of a location of the transverse support member along the left and right frame members in the first direction.

11. The apparatus of claim 9, additionally comprising a first upward-extending support member attached to the left frame member and a second upward-extending support member attached to the right frame member, wherein
   the clear plate is attached to the upward-extending support members to extend between the upward-extending support members, and wherein the upward-extending support members are each attached to one of the frame members in a manner allowing adjustment of a location of the upward-extending frame member along the frame member in the first direction, and
   the clear plate is attached to each of the upward-extending support members in a matter allowing adjustment of a location of the clear plate along the upward-extending support member in a direction perpendicular to the first direction.

12. The apparatus of claim 1, wherein the first portion of the frame includes at least one frame surface configured to rest atop the shoulders of the user as the user faces in the first direction, and
   the second portion of the frame is configured to hold a lower edge of the clear plate spaced in the first direction away from the at least one frame surface and in alignment in a direction perpendicular to the first direction with the at least one frame surface.

13. The apparatus of claim 12, wherein
   the frame comprises a left frame member, a first upward-extending support member attached to the a left frame member, a right frame member, and a second upward-extending support member attached to the right frame member,
   the clear plate is attached to each of the upward-extending support members by a plurality of cylindrical pins extending outward from an edge of the clear plate, engaging holes within a plurality of holes disposed along the upward-extending support member, being spaced apart in a direction perpendicular to the first direction, and
   each of the upward-extending support members is attached to one of the left and right frame members by a plurality of cylindrical pins extending outward from the upward-extending support member into a plurality of holes disposed along the frame member, being spaced apart in the first direction.

14. The apparatus of claim 13, wherein
   the apparatus additionally comprises a first downward-extending support member attached to the left frame member, a second downward-extending support member attached to the right frame member, the frame additionally comprises a transverse support member configured to extend adjacent a back of the user facing in the first direction with the first portion fitting over his shoulders, each of the downward-extending support members is attached to one of the left and right frame members by a plurality of cylindrical pins extending outward from the downward-extending support members into a plurality of holes disposed along the frame member, being spaced apart in the first direction to allow adjustment of a location of the downward-extending support member along the frame member in the first direction, and the transverse support member is attached to extend between the first and second downward-extending support members.

15. The apparatus of claim 9, wherein the clear plate and the transverse support member each include left and right ends, the left end of the clear plate and the left end of the transverse support member are each pivotally mounted on the left frame member;

the right end of the clear plate and the right end of the transverse support member are each pivotally mounted on the right frame member, the apparatus is movable between a folded configuration, in which the left and right frame members, the clear plate, and the transverse support member each extend in the first direction, and an open configuration, in which the left and right frame members each extend in the first direction, while the clear plate and the transverse support member each extend in a direction perpendicular to the first direction.

16. The apparatus of claim 15, additionally comprising at least one clamping member mounted to slide along one of the left and right frame members between a position holding the clear plate to extend in the direction perpendicular to the first direction, and a position releasing the clear plate to pivot as the apparatus is moved between the open and closed positions, wherein the clamping member additionally includes a flexible portion movable along a front surface of the clear plate to hold a clear drawing medium against the front surface of the clear plate.

17. A method for drawing an image of an object by a user, wherein the method comprises:

attaching a clear drawing medium to a front surface of a clear plate held within a drawing frame, holding the drawing frame in a position, relative to the user, by placing a first portion of a drawing frame over the shoulders of the user, wherein the first portion of the drawing frame is configured to fit over shoulders of the user facing in a first direction, and wherein a second portion of the drawing frame extends in the first direction to hold the clear plate in a location suitable for the user to view the object through the clear plate and to draw on a clear drawing medium, and wherein the second portion extends under a space adjacent the front surface of the clear plate, and wherein the clear plate is suitable for viewing the object through the clear plate and for drawing elements of the object at locations where the elements appear to the user while viewing the object through one eye on a clear drawing medium attached to the clear plate, aligning the user and the drawing frame so that the user views the object through the clear plate; and drawing the image of the object on the clear drawing medium with a drawing instrument while viewing the image of the object with one eye.

18. The method of claim 17, preceded by moving the drawing frame from a closed condition, in which the clear plate, left and right frame members, and a transverse support plate all forming the drawing frame, each extend in a common direction, and an open condition, in which the clear plate and the transverse support plate extend perpendicular to the common direction, between the left and right frame members.

* * * * *